United States Patent Office 3,640,933
Patented Feb. 8, 1972

3,640,933
PREPARATION OF POLYACROLEIN-SODIUM BISULFITE ADDUCT
George T. Kekish, Chicago, William G. James, Joilet, and Duane J. Simons, Chicago, Ill., assignors to Nalco Chemical Company, Chicago, Ill.
No Drawing. Filed Mar. 20, 1969, Ser. No. 809,026
Int. Cl. C08f 45/24
U.S. Cl. 260—29.6 R                                    7 Claims

ABSTRACT OF THE DISCLOSURE

In the process of producing an aqueous bisulfite adduct useful as a paper mill additive from a wet cake of polyacrolein containing about 40–50% solids, water and at least one $C_5$–$C_8$ alkane as a non-solvent diluent produced by homopolymerizing the acrolein monomer by an invert emulsion technique, the improvements consisting in forming a reaction mix utilizing a bisulfite reactant in a weight ratio of about 1.5–2.5 parts per part of polyacrolein based upon theoretical monomer, stripping the $C_5$–$C_8$ alkane diluent from the reaction mix by azeotropic vacuum distillation for a short time period and subsequently heating and reacting the polyacrolein and bisulfite for about 1–3 hours at 195–205° F. at atmospheric pressure and at an acid pH of 3.5–4.5 to produce an aqueous polyacrolein-bisulfite adduct and terminally heating the reaction mix by vacuum distillation for a short period of time to remove residuum $C_5$–$C_8$ alkane diluent and $SO_2$ and adjusting the water content so that the now dissolved polyacrolein (PAC) bisulfite adduct solids equal about 35% of the total.

---

The present invention relates to the processing of polyacrolein bisulfite adduct to produce products specially useful in paper mill operation for adding improved properties to paper. The final products may be applied to the paper before or after the beater stage or as after treatment of paper. In particular, the present invention contemplates processing of the polymerized acrolein monomer derived from the suspension or emulsion polymerization of the said monomer utilizing the generalized technique of U.S. 3,069,389 Welch. In the Welch technique an "inert water-immiscible organic compound" or "non-aqueous diluent" is utilized to facilitate the polymerization reaction and of those mentioned at columns 3–4 the present invention contemplates utilizing the $C_5$–$C_8$ saturated aliphatic hydrocarbons, namely, pentane, hexane, heptane, octane, and branhced chain varieties such as iso-octane.

Furthermore, the present invention is directed towards processing a wet cake product of an invert emulsion or O/W emulsion from the polymerization wherein the aqueous phase is the continuous phase, and in the preferred process the terminal ratio diluent:water is about 3:1. For example, in a preferred example, the initial conditions in the polymerization were diluent:acrolein:water=1:1:1 by weight, and during the reaction an additional two parts of diluent were added, thus giving a final ratio of 1:3 water:diluent or 3:1 diluent:water. At the termination of the polymerization reaction, but prior to drying, a wet cake of polyacrolein is produced containing polyacrolein, water. and the inert diluent which in the case of this invention is pentane, hexane, heptane, octane, or an aliphatic cut consisting of a mixture of these compounds. The solids content of the polyacrolein wet cake ranges from 40–50% and the solid polyacrolein itself contains about 20% water of hydration. This invention deals with the processing of this "polyacrolein wet cake."

Heretofore the wet cake polyacrolein was dried by a lengthy process, in some cases taking up to four days, during which time undesirable side reactions involving cross-linking through the carbonyl groups (1,2 polymerization) tended to occur. Furthermore, since the input to the paper mill was desired in terms of about a 35% solids solution, complete liquid removal, followed by formation of the adduct, was cumbersome and expensive.

In addition, to Welch above, the following represent prior art directed toward the present invention:

U.S. 3,079,357—Fischer (Shell)
U.S. 3,189,577—Ryder (Shell)
U.S. 3,215,612—Stewart, et al. (Shell)
U.S. 3,235,524—Kern, et al. (Deutsches Gold)
U.S. 3,248,355—Welch, et al. (Union Carbide)
U.S. 3,271,334—Kern, et al. (Deutsches Gold)

None of the patented art above attacks the particular problem set out below nor do they use equivalent procedures.

In practice, the present invention takes the wet cake before drying from the product line of the invert emulsion polymerization of polyacrolein and places this wet cake containing 40–50% solids in a reactor to which an excess of a bisulfite reactant, together with deionized (d.i.) water are added with agitation. The alkane non-aqueous diluent remnant from the acrolein polymerization is distilled off in vacuo preferably at the azeotrope boiling point of the binary alkane/$H_2O$ mixture in question. The vacuum technique depresses the azeotropic boiling point in a manner similar to vacuum effect on a normal pressure compound boiling point. Following this treatment, which lasts 10–30 minutes, the temperature of the reactor is brought to the range 195–205° F. with agitation to effect the reaction between the polyacrolein and excess bisulfite. This reaction heating is made at atmospheric pressure and the pH, which is normally quite acid, is adjusted upward to maintain an acid pH of about 3.5–4.5. At the end of 1–3 hours the reaction is complete and, if necessary, water (d.i.) addition is made to bring about a 35% solids concentration suitable for tank car shipment to paper mills. Optionally, a second or terminal vacuum azeotropic distillation is made similar to the first azeotropic distillation to clear up any residuum alkane and to degasify the adduct from any $SO_2\uparrow$ released by the heated acid bisulfite solution.

THE VACUUM AZEOTROPE HEATING STEPS

Although it would be preferable theoretically to eliminate the alkane from the reaction site prior to introducing bisulfite, the actual or potential presence of small amounts of highly acrid acrolein monomer make it an overriding concern to combine the monomer first for industrial productivity and safety. Therefore, in the present invention, the preferred modus is to vacuum distill the alkane from the wet cake of polyacrolein in the presence of excess bisulfite reactant, i.e., the alkane is distilled off after the introduction of bisulfite reactant.

Furthermore, in the preferred operation of the present process there is a central period of reaction heating preceded and followed by short periods of vacuum heating at azeotropic temperatures.

The initial vacuum heating step is an azeotropic distillation at the azeotropic B.P. of the binary alkane/water mix to drive off the majority of non-aqueous diluent (alkane) under an operable vacuum of 100–300 mm. Hg.

A preferred operation is at 300 mm. vacuum for 10–30 minutes. In the case of heptane where the azeotrope B.P.

is 174° F., the vacuum enabled the temperature of distillation to be reduced to about 154° F.

BINARY AZEOTROPE

The $C_5$–$C_8$ alkanes, such as n-pentane, n-hexane, n-heptane, n-octane, and iso-octane (trimethylpentane) form binary aqueous azeotropes which have boiling point uniformly lower than the reference alkane as noted below.*

Thus, the utilization of azeotropic distillation permits the elimination of inert diluent from the formed wet cake since the azeotrope boiling points are all below the B.P. of water, 100° C. (212° F.). Furthermore, the utilization of the azeotrope phenomenon is facilitated by employment of vacuum which depresses the normal pressure azeotrope B.P. and accelerates the distillation.

The second and terminal vacuum heating step following the reaction heating is conducted at about the same temperature as the initial vacuum heating and serves to eliminate any residuum of the alkane as well as to drive off any $SO_2\uparrow$ released by the hot acid bisulfite reactant. The second vacuum heating step is also conducted for about 10–30 minutes at about 100–300 mm. vacuum with an upper limiting temperature of the azeotrope B.P. at normal pressure. This normal operating temperature may be reduced somewhat in practice due to lowering of the azeotropic boiling point under vacuum conditions.

THE REACTION HEATING STEP

Amount of bisulfite reactant

The present invention is predicated in part on the basis that an amount of $SO_2$-containing material in excess of the stoichiometric amount is necessary to form a bisulfite adduct ($MHSO_3$) per aldehyde unit in the polymer (on a theoretical monomer basis). The products of the present invention find utility in paper making and, in consideration of superior gelling characteristics in that connection, the present process prefers a reactant ratio of bisulfite/polyacrolein (PAC) hydrated by weight of 1.5:2.5:1 with an optimum range of about 2.0:1 and an optimum molar ratio of 1.3:1. A conversion factor of $$.80 = \frac{PAC}{PAC \text{ hydrate}}$$

Temperature of reaction heating or operating reaction temperature

The operable reaction temperature is about 195–205° F. with a preferred range of 195–200° F. The temperature is maintained as high as feasible to obtain a high reaction rate and limited by the known fact that at about 212° F. (100° C.) the bisulfites break down in hot acid medium and release $SO_2\uparrow$.

pH control

The reaction mix is maintained during the reaction at an acid pH of 3.5 to 4.5. Due to the strongly acid character of the bisulfite, initial conventional adjustment of the pH may be made utilizing a strong base such as KOH or NaOH.

Time

The dissolving of the wet cake polyacrolein and formation of the bisulfite adduct is complete in 1–3 hours of reaction time.

EXAMPLE 1

To a 100-gallon reactor was charged 383 lbs. of water, 162 lbs. sodium bisulfite and 150 lbs of polyacrolein wet cake. This polyacrolein (PAC) wet cake contained 45%

---

*Data from Azeotropic Data II Horsley, Advances in Chemistry No 35 (1962)—A.C.S.

|  | B.P. | Azeotropic B.P. |
|---|---|---|
| $C_5H_{12}$ n-pentane | 36.1 | 34.6 (94.3° F.) |
| $C_6H_{14}$ n-hexane | 68.6 | 61.6 (142.9° F.) |
| $C_7H_{16}$ n-heptane | 98.4 | 79.2 (174.6° F.) |
| $C_8H_{18}$ n-octane | 125.7 | 89.6 (193.3° F.) | solids. The pH was adjusted to 4.5 with 50% sodium hydroxide.

The reactor was heated to 175° F. and a vacuum of 300 mm. Hg was applied for 10 to 15 minutes. When the vacuum was applied, the temperature dropped to 155–160° F. and approximately ½ gallon of n-heptane (Skelly-C) was taken off.

The vacuum was released and the reactor heated to 195–200° F. for 2 hours, while the mixture was agitated. The polymer dissolved.

A vacuum of 300 mm. Hg was applied to the reactor for about one-half hour and the temperature dropped to 150° F. The final product which was a polyacrolein·sodium bisulfite adduct in a water solution had a concentration of solids of 35%.

EXAMPLE 2A

Using the process of Example 1, modified by increasing the amount of sodium bisulfite to 212 lbs. (approximately 2:1 weight ratio bisulfite:polyacrolein), a similar solution of polyacrolein was obtained yielding the sodium bisulfite adduct.

EXAMPLE 2B

Utilizing the process of Example 1, modified by increasing the amount of sodium bisulfite to 270 lbs. (approximately 2.5 weight ratio sodium bisulfite:polyacrolein), yielded a clear solution of the sodium bisulfite adduct of polyacrolein.

EXAMPLE 3

Comparative example teaching azeotropic distillation prior to addition of bisulfite reactant Into a 200 gallon reactor was placed 100 parts (wt.) of wet cake polyacrolein measuring 45% solids. The solids content was adjusted with d.i. water to achieve a final solids concentration of about 35%. The wet cake polyacrolein was derived from an invert polymerization of acrolein monomer wherein the final ratio in the wet cake of aqueous non-solvent n-hexane (Skelly B) was about 3:1 of the water present prior to d.i. water addition.

While agitating, vacuum was applied ($\simeq$100 mm.) and the mixture was heated to about 50° C. (122° F.). Acrolein monomer and heptane-water azeotrope distillate were taken off overhead and the distillate was recovered and equivalent water returned to the reactor.

200 parts sodium bisulfite was then added while agitating and the pH of the mixture was adjusted to 4.5–5.0 with 50% NaOH. Reaction heating was then accomplished by heating to about 90° C. (194° F.) and this was held for two hours until the polymer dissolved and the solution was clear. A measurement was made of heptane content in the solution and the liquid was cooled and remaining traces of heptane were removed. The liquid product was filtered through a cartridge and sent to a tank car shipment overland to a paper plant.

DEFINITIONS

In this specification and appended claims the following definitions are intended to apply:

"Wet cake polyacrolein."—this term and analogous expressions are designed to apply to a filter cake of polyacrolein containing 40–50% solids and derived from an invert emulsion O/W of the acrolein monomer and containing hydrated and occluded water and a non-aqueous diluent selected from the group consisting of $C_5$–$C_8$ alkanes, such as n-pentane (Skelly-A), n-hexane (Skelly-B), n-heptane (Skelly-C) n-octane and iso-octane or a petroleum cut embodying one or more of these alkane compounds.

Polymerizing under normal inert conditions is defined under the present specification and claims to mean polymerizing in an inert atmosphere (e.g., $N_2$) under the temperature conditions set out in this specification and preferably about 0–40° C., at a slight positive pressure above 1 atmosphere (+1–5 pounds per square inch), and using a final weight ratio of acrolein-water:non-aqueous diluent of preferably about 1:1:3 and ranging upward to about 1:1:5. Modification of technique U.S. 3,069,389, Welch, cf. this specification, p. 2.

Non-aqueous diluent and non-solvent as used in the art are synonymous for purposes of this specification and claims and these terms refer to the oil and/or discontinuous phase of the termed "invert oil-in-water (O/W) emulsion."

The bisulfite reactant instrumental in forming the adduct has been defined in the prior patent art as "one whose acidic solution releases sulfur dioxide if heated, say to a temperature of 100° C." Cf. U.S. 3,189,577 Ryder, et al. (Shell) at cols. 4–5. For purposes of the present invention, the term "bisulfite reactant" and the like incorporates by reference the materials set out above in Ryder, col. 5, lines 2–10 inclusive. Furthermore, the present invention utilizes as preferred bisulfite reactants the following: alkali metal bisulfites such as sodium and potassium bisulfite, sodium metabisulfite and ammonium bisulfite.

Azeotropic distillation temperature refers to the binary alkane/water distillation at normal pressure which temperature is operable for all examples. When operating at reduced pressures, slightly lower temperatures may be utilized consonant with the effluent temperature which is the vacuum azeotropic distillation temperature.

"M-bisulfite" and "M-bisulfite adduct"—The "M" refers to a metal selected from the group consisting of sodium, potassium and ammonium bisulfites.

The embodiments of the invention in which an exclusive property or privilege is claimed are defined as follows:

1. In a process of preparing an aqueous metal bisulfite adduct useful as a paper mill additive from a wet cake polyacrolein containing about 40–50% solids admixed with water and at least one $C_5$–$C_8$ alkane as a non-solvent diluent, said polyacrolein derived by homopolymerizing acrolein monomer by an oil-in-water invert emulsion, the improvements which consist of:

(a) Adding to the wet cake polyacrolein sufficient bisulfite reactant to form a metal bisulfite/polyacrolein hydrate ratio of about 1.5–2.5:1 weight ratio based on theoretical monomer and forming a reaction mix;

(b) Stripping the $C_5$–$C_8$ alkane from the reaction mix by azeotropic distillation in vacuo at about the azeotropic B.P. of the said diluent-water mixture for about 10–30 minutes;

(c) Subsequently heating the reaction mix for about 1–3 hours at about 195–205° F. at atmospheric pressure and an acid pH of about 3.5 to 4.5 to produce an aqueous polyacrolein·bisulfite adduct, and (d) Adjusting the solids content to about 30–40% for tank car transport by aqueous addition.

2. The process according to claim 1 wherein the $C_5$–$C_8$ alkane is n-pentane.

3. The process according to claim 1 wherein the $C_5$–$C_8$ alkane is n-hexane.

4. The process according to claim 1 wherein the $C_5$–$C_8$ alkane is n-heptane.

5. The process according to claim 1 wherein the $C_5$–$C_8$ alkane is iso-octane.

6. The process according to claim 1 wherein the $C_5$–$C_8$ alkane is n-octane.

7. The process according to claim 1 where subsequent to the reaction heating (c), the reaction mix is (c') again azeotropically distilled under the same conditions as the initial stripping distillation (b) to remove residuum $C_5$–$C_8$ alkane and $SO_2\uparrow$.

References Cited
UNITED STATES PATENTS

| | | | |
|---|---|---|---|
| 3,069,389 | 12/1962 | Welch | 260—67 |
| 3,189,577 | 6/1965 | Ryder et al. | 260—67 |
| 3,248,355 | 4/1966 | Welch et al. | 260—67 |

HAROLD D. ANDERSON, Primary Examiner

U.S. Cl. X.R.

162—164 R

PO-1050
(5/69)

UNITED STATES PATENT OFFICE
CERTIFICATE OF CORRECTION

Patent No. 3,640,933    Dated February 8, 1972

Inventor(s) George T. Kekish, William G. James, and Duane J. Simons

It is certified that error appears in the above-identified patent and that said Letters Patent are hereby corrected as shown below:

Column 1, line 4, "Joilet" should read -- Joliet --; line 37, "acrolein bisulfite" should read -- acrolein via the addition of sulfurous acid groups to form a polyacrolein bisulfite --; line 51, "branhced" should read -- branched --; line 65, "water." should read -- water, --.

Column 5, line 1, "acrolein-water" should read -- acrolein:water --.

Signed and sealed this 11th day of July 1972.

(SEAL)
Attest:

EDWARD M. FLETCHER, JR.
Attesting Officer

ROBERT GOTTSCHALK
Commissioner of Patents